United States Patent Office

3,422,132
Patented Jan. 14, 1969

3,422,132
PREPARATION OF PRIMARY
α-AMINONITRILES
Julius Fuchs, Wilmington, Del., assignor to E. I. du Pont de Nemours and Company, Wilmington, Del., a corporation of Delaware
No Drawing. Filed Mar. 15, 1966, Ser. No. 534,406
U.S. Cl. 260—464                     3 Claims
Int. Cl. C07c *121/00;* C07b *29/00*

ABSTRACT OF THE DISCLOSURE

Primary α-aminonitriles are prepared by reacting hydrogen cyanide with a N-chloroimine at a molar ratio of hydrogen cyanide to N-chloroimine of at least 3:1, optionally in the presence of an inert solvent. The primary α-aminonitrile hydrochloride produced is separated from the reaction mixture and then reacted with a base to obtain the free primary α-aminonitrile.

---

This invention relates to processes for the preparation of primary α-aminonitriles. More particularly, this invention relates to processes for the preparation of primary α-aminonitriles by the addition of hydrogen cyanide to N-chloroimines.

According to the present invention primary α-aminonitriles of the following formula:

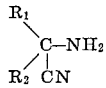

are prepared by the process comprising
(1) Reacting hydrogen cyanide with a N-chloroimine of the following formula:

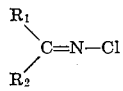

at a molar ratio of hydrogen cyanide to N-chloroimine of at least 3:1, optionally, in the presence of an inert solvent, to obtain a reaction product mixture containing a primary α-aminonitrile hydrochloride of the following formula:

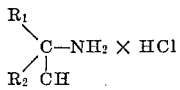

(2) Separating said primary α-aminonitrile hydrochloride from the reaction mixture and
(3) Reacting said primary α-aminonitrile hydrochloride with a base to obtain said primary α-aminonitrile.

In the above formulae, $R_1$ can be hydrogen, phenyl, or aliphatic of 1 to 14 carbon atoms; $R_2$ can be aliphatic of 1 to 14 carbon atoms, or $R_1$ and $R_2$ taken together can be cycloaliphatic of 4 to 16 carbon atoms.

The primary α-aminonitrile produced by the process of the invention is represented by the general formula:

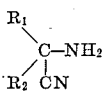

wherein
$R_1$ is hydrogen, phenyl or aliphatic of 1 to 14 carbon atoms;
$R_2$ is aliphatic of 1 to 14 carbon atoms
or $R_1$ and $R_2$ taken together can be cycloaliphatic of 4 to 16 carbon atoms.

Some specific compounds that can be produced by this subject process are:

cyclohexanone-aminonitrile
cyclobutanone-aminonitrile
cyclooctanone-aminonitrile
cyclododecanone-aminonitrile
methylisopropylketone-aminonitrile
methylisobutylketone-aminonitrile
methyl-n-hexylketone-aminonitrile
methyl-tert-butylketone-aminonitrile
butyraldehyde-aminonitrile
acetaldehyde-aminonitrile
benzaldehyde-aminonitrile
methyl-methoxyisobutylketone-aminonitrile
diethylketone-aminonitrile.

These α-aminonitrile compounds are useful as intermediates in synthesis of many compounds, e.g. they are useful in producing amino acids by hydrolyzation or for producing symmetrical azo-nitriles.

The novel process of the invention is of particular advantage in that a high yield, on the order of 70% to 95%, based on the N-chloroimine used, is obtained.

STARTING MATERIALS

The N-chloroimines useful in the process of the invention are those N-chloroketimines, or N-chloroaldimines represented by the following equation:

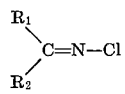

in this equation, $R_1$ represents hydrogen, phenyl or aliphatic of 1 to 14 carbon atoms; $R_2$ can be aliphatic of 1 to 14 carbon atoms or $R_1$ and $R_2$ can be taken together and be cycloaliphatic of 4 to 16 carbon atoms.

These N-chloroimines can be prepared by methods known in the art. Thus they can be prepared by dehydrochlorinating an N-dichlorinated amine using an alkaline reactant such as described in Reid U.S. Patent 3,137,728, issued June 16, 1964, or they can be prepared by the reaction of an aldehyde with chloroamine.

The N-chloroimine compound used will correspond to the primary α-aminonitrile to be synthesized. Examples of the N-chloroimines useful in the process of the invention include:

N-chloro-cyclohexylidenimine
N-chloro-cyclobutylidenimine
N-chloro-cyclooctylidenimine
N-chloro-1,3-dimethyl-butylidenimine
N-chloro-1-ethyl-propylidenimine
N-chloro-1-isopropyl-2-methyl-propylidenimine
N-chloro-1,2-dimethyl-propylidenimine
N-chloro-1-methyl-hexylidenimine
N-chloro-benzylidenimine
N-chloro-ethylidenimine
N-chloro-butylidenimine
N-chloro-1,3-dimethyl-3-methoxy-butylidenimine
N-chloro-1,3,3-trimethyl-propylidenimine.

Hydrogen cyanide is commercially available or may be prepared by processes well known in the art, such as reacting a cyanide with dilute sulfuric acid or decomposition of formamide.

REACTION CONDITIONS

Hydrogen cyanide is liquid at temperatures below 27° C. at atmospheric pressure, and it is preferred that the process be run under such conditions of temperature and pressure to maintain it in the liquid phase.

The N-chloroimines are generally in the liquid phase at atmospheric pressure and room temperature, and it is desirable that they remain in this phase during the course of the reaction.

The hydrogen cyanide is added to the N-chloroimines at such a rate to give a concentration of at least 3 moles of hydrogen cyanide per mole of N-chloroimine. There is no upper limit in the amount of hydrogen cyanide that can be added, however, above 6 or 7 moles per mole of N-chloroimines, no particular advantage is obtained.

The two active ingredients can be reacted in the presence of an inert solvent, however, this is not necessary and in some embodiments the excess hydrogen cyanide can act as a solvent.

Solvents useful in the process of this invention are those organic solvents that are unreactive with the active ingredients and in which the hydrogen cyanide is soluble. Those solvents in which the α-aminonitrile hydrochloride formed is insoluble are particularly useful in that they provide an easy method of separation. However, this property is not critical as the α-aminonitrile can be separated by stripping off the solvent. Useful solvents include many of the alcohols, e.g. ethanol, methanol, isopropanol, etc., ethers, e.g. diethyl ether, and halogenated compounds, e.g. methylene chloride and chloroform.

The reaction can take place in any suitable reaction vessel. It is preferable that the vessel have means for agitating the contents. If desired, the process can incorporate a packed column wherein a reflux of hydrogen cyanide is created.

In the process of this invention, the N-chloroimine is added to the hydrogen cyanide and mixed to form a homogeneous liquid mixture, this can be, if desired, in a solvent media. The reaction is maintained at such condition of pressure and temperature to keep the reactant in the liquid phase.

The initial temperature of the compounds being mixed can be anything above their freezing point, but generally will be in the range of 0 to 25° C. The reaction itself is exothermic in character and external heat need not be applied. However, the temperature of the reaction should be controlled such that it is below 27° C. at atmospheric pressure; this range of temperature maintains the hydrogen cyanide as a liquid.

The reaction will normally be conducted at atmospheric pressure; however, if a higher rate of reaction is desired, the reaction can be operated at superatmospheric pressure. In the superatmospheric embodiment, the temperature will be generally higher, but still within the necessary range to maintain the hydrogen cyanide in a liquid state.

The reaction starts immediately upon the mixing of the two reactants and is generally completed within a short period of time, the time depending upon the temperature and the type of reactant used. Generally if the reaction is maintained at 30° C. and atmospheric pressure, the reaction will be complete in one hour or more. However, when higher temperatures are used, a shorter reaction time is obtained. Additionally, it has been found that longer reaction times, i.e. allowing the reaction mixture to stand overnight, can be accomplished without adverse effect.

As the reaction proceeds to completion, a precipitate is formed. This precipitate is composed of crystals of a primary α-aminonitrile hydrochloride of the following formula:

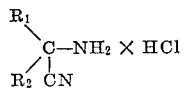

wherein the $R_1$ and $R_2$ are as previously set forth.

This precipitate can be separated from the remainder of the reaction mixture by any suitable method, the easiest being by filtration or evaporation of the solvent present and the other liquid reaction products. The remaining reaction mixture is in the liquid phase and is composed of liquid hydrogen cyanide, any solvent used, and other reaction products not positively identified.

It is believed that the basic over-all reaction is illustrated by the following equation where $R_1$ and $R_2$ are the same as previously set forth.

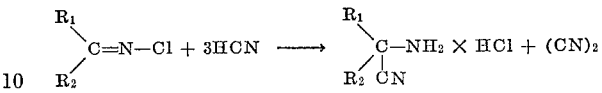

In this reaction the $(CN)_2$ would either evolve as a gas or dissolve in the excess hydrogen cyanide or solvent present. However, the presence of $(CN)_2$ has not been positively identified and therefore the process of the invention is not to be limited to any particular theory of reaction; the essential feature of the reaction being the formation of the crystals of the primary α-aminonitrile hydrochloride.

The reaction mixture is then processed to separate that α-aminonitrile hydrochloride from the other reaction products, e.g. by filtration. Thus, the process of this invention also provides a means of obtaining these primary α-aminonitrile salts in good yield. The aminonitrile hydrochlorides also have many uses as intermediates in chemical synthesis as do the basic compounds.

The primary α-aminonitrile hydrochloride is then converted into the desired primary α-aminonitrile by reacting it with a base. Any base that removes the hydrochloride group may be used and suitable ones are the strongly basic alkaline reactants such as sodium hydroxide, potassium hydroxide, calcium hydroxide, etc. Also the weaker base can be used, i.e. tertiary amines, cyclic amines, and the like. The amount of the base used will ordinarily be a slight excess over the stoichiometric amount necessary for the reaction. The excess inorganic base helps in the subsequent isolation step.

After the crystals of primary α-aminonitrile hydrochloride have been reacted with the base the desired primary α-aminonitrile is formed. The primary α-aminonitriles are separated from the reaction product or products by common laboratory techniques. When $R_1$ and $R_2$ are large groups, i.e. cycloaliphatic or aliphatic or 5 to 14 carbon atoms, this step is not difficult since the primary α-aminonitrile will come out as a separate phase, an oil phase. When $R_1$ or $R_2$ are hydrogen, or small groups of 1 to 4 carbon atoms, the separation is not as simple as the primary α-aminonitrile remains partly dissolved in the aqueous reaction products. However, under these circumstances the product can be separated by several conventional techniques and the manner of separation is not critical to the invention.

Separation can be effected by addition of inorganic salts, such as NaCl, to the aqueous phase. This causes the aminonitrile to separate as an oil phase. Other methods are by evaporation of the solvent water, or by extraction with a suitable water immiscible organic solvent, such as dimethyl ether or methylene chloride.

The processes of the invention can be conducted batchwise or in a semi-continuous or continuous manner. In the continuous operation, the two reactants would be brought together continuously and the reaction controlled by the circulation of heat transfer fluids through the reaction zone.

The following examples are given to illustrate the invention. The properties used are parts by weight unless otherwise indicated.

EXAMPLE 1

Thirty-three parts of N-chloro-cyclohexylindenimine is mixed in a flask with 34 parts of liquid hydrogen cyanide. This is a ratio of moles of hydrogen cyanide to N-chloroimine of 5:1. The reactants are initially at 0° C., and the temperature of the reaction is allowed to rise to 30° C. This temperature is maintained by refluxing the excess hydrogen cyanide. A solid precipitate is formed in the bottom of the flask.

The reaction mixture is allowed to stand overnight and the precipitate is extracted with 50 ml. of water. The solution is then separated from the undissolved material by filtration. The filtrate is then evaporated and the resulting crystals of cyclohexanone-aminonitrile-hydrochloride are converted with 12.5 parts of sodium hydroxide in H₂O solution to the free aminontrile. This reaction produces an oil layer which is separated from the liquid reaction products by decantation.

Infra-red analysis of the oil layer indicates that cyclohexanone aminonitrile is formed. The yield of this reaction was 91% based on the cyclohexane-N-chloroketimine used.

EXAMPLE 2

Twenty-six and four-tenths parts of N-chloro-n-butylidenimine (0.25 mole) is mixed in a flask with 35 parts liquid hydrogen cyanide (1.30 moles). The rectants are initially at 0° C. and the temperature of the reaction is allowed to rise to 30° C. This temperature is maintained by refluxing the excess hydrogen cyanide. A solid precipitate is formed in the bottom of the flask.

The reaction mixture is allowed to stand overnight and the precipitate is extracted with 50 ml. of water. The solution is then separated from the undissolved material by filtration. Addition of 12.5 parts of sodium hydroxide to the filtrate and saturation with sodium chloride liberates the free aminonitrile, which separates as an oil layer. Yield of butyraldehyde-aminonitrile is 80% based on N-chloro-n-butylidenimine.

EXAMPLE 3

Thirty parts of N-chloro-cyclohexylidenimine (0.25 mole) in 100 ml. methylenechloride is mixed in a flask with 35 parts (1.30 moles) of liquid hydrogen cyanide. The reactants are initially at 0° C. and the temperature of the reaction is allowed to rise to 30° C. A solid precipitate is formed.

The reaction mixture is allowed to stand overnight. The precipitate of diethylketone-aminonitrile hydrochloride is isolated by filtration and converted with 12.5 parts of sodium hydroxide in water solution to the free aminonitrile. The free aminonitrile is extracted from the water solution with dimethyl ether and isolated in 90% yield by evaporation of the solvent.

The process of the invention is of particular advantage in view of the fact the N-chloroimines used as a reactant are produced from the corresponding amines, thus the process provides a high yield of the primary α-aminonitriles.

I claim:
1. A process for preparing primary α-aminonitriles of the following formula

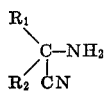

comprising
(1) reacting hydrogen cyanide in liquid phase with an N-chloroimine compound of the formula

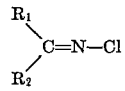

said hydrogen cyanide and said N-chloroimine being present in a molar ratio of at least 3:1, to obtain a reaction product mixture containing a primary α-aminonitrile hydrochloride of the formula

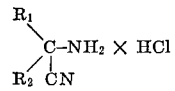

(2) separating said primary α-aminonitrile hydrochloride from the reaction mixture, and
(3) reacting said primary α-aminonitrile hydrochloride with a base to obtain said primary α-aminonitrile, wherein the above formulae $R_1$ is hydrogen, phenyl or alkyl of 1 to 6 carbon atoms; $R_2$ is alkyl of 1 to 6 carbon atoms; or $R_1$ and $R_2$ taken together with the carbon atom to which they are bonded form cyclo-alkyl of 4 to 12 carbon atoms.

2. A process as set forth in claim 1 wherein the reaction between the hydrogen cyanide and the N-chloroimine is conducted in the presence of an inert organic solvent.

3. A process for preparing primary α-aminonitrile hydrochlorides of the formula

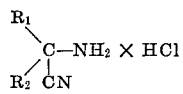

comprising reacting hydrogen cyanide in liquid phase with an N-chloroimine compound of the formula

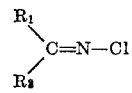

said hydrogen cyanide and said N-chloroimine being present in a molar ratio of at least 3:1, to obtain a reaction product mixture containing said primary α-aminonitrile hydrochloride and separating said primary α-aminonitrile hydrochloride from the reaction mixture, wherein the above formulae $R_1$ is hydrogen, phenyl or alkyl of 1 to 6 carbon atoms; $R_2$ is alkyl of 1 to 6 carbon atoms; or $R_1$ and $R_2$ taken together with the carbon atom to which they are bonded form cyclo-alkyl of 4 to 12 carbon atoms.

References Cited

UNITED STATES PATENTS 2,894,028    7/1959    Rudner.

OTHER REFERENCES

Organic Chemistry, Cram and Hammond, 1964, p. 306.
Synthetic Organic Chemistry, Wagner and Zook, 1963, pp. 606–607.

CHARLES B. PARKER, Primary Examiner.

S. T. LAWRENCE III, Assistant Examiner.

U.S. Cl. X.R.

260—192, 465, 465.5, 514, 518, 534